US009712306B2

(12) United States Patent
Ji et al.

(10) Patent No.: US 9,712,306 B2
(45) Date of Patent: Jul. 18, 2017

(54) ADAPTIVE LINK ADAPTATION FOR WIRELESS COMMUNICATIONS

(71) Applicant: Apple Inc., Cupertino, CA (US)

(72) Inventors: Zhu Ji, San Jose, CA (US); Johnson O. Sebeni, Fremont, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 521 days.

(21) Appl. No.: 14/157,509

(22) Filed: Jan. 16, 2014

(65) Prior Publication Data

US 2014/0307645 A1 Oct. 16, 2014

Related U.S. Application Data

(60) Provisional application No. 61/754,929, filed on Jan. 21, 2013.

(51) Int. Cl.
H04L 5/00 (2006.01)
H04L 1/00 (2006.01)
H04L 1/20 (2006.01)

(52) U.S. Cl.
CPC .......... H04L 5/0053 (2013.01); H04L 1/0003 (2013.01); H04L 1/0009 (2013.01); H04L 1/0019 (2013.01); H04L 1/203 (2013.01); H04L 5/0055 (2013.01)

(58) Field of Classification Search
CPC ... H04L 1/0003; H04L 1/0009; H04L 1/0026; H04L 1/0019; H04L 1/203; H04L 5/0053; H04L 5/006; H04L 5/0055; H04L 5/003; H04L 5/0016
USPC ....................................................... 370/329
See application file for complete search history.

(56) References Cited

U.S. PATENT DOCUMENTS 7,289,574 B2    10/2007  Parolari
7,970,001 B2     6/2011  Hoshino et al.
2003/0204615 A1* 10/2003 Wei .................. H04L 1/0019
                                              709/232

(Continued)

FOREIGN PATENT DOCUMENTS

CN    101188446 A    5/2008

OTHER PUBLICATIONS

Office Action, Taiwan Application No. 103102152, issued Sep. 23, 2015, 10 pages.

(Continued)

Primary Examiner — Michael Thier
Assistant Examiner — Rownak Islam
(74) Attorney, Agent, or Firm — Meyertons, Hood, Kivlin, Kowert & Goetzel, P.C.

(57) ABSTRACT

A wireless communication system is presented in which subframe-specific link adaptation is performed. A mobile device can transmit a signal that informs a base station whether a particular subframe was received successfully. Additionally the mobile device can calculate channel state information (CSI) for a subframe and report the CSI to a base station. The reported CSI may or may not include an indicator for informing the base station about from which type of subframe the CSI was derived. The base station can receive the signal, the CSI and/or the indicator. Based on what information the base station has received, it performs subframe-specific BLER filtering and subframe-specific link adaptation scheduling and MCS adjustments.

20 Claims, 18 Drawing Sheets

(56) References Cited

U.S. PATENT DOCUMENTS

| | | | |
|---|---|---|---|
| 2006/0093024 A1 | 5/2006 | Pietraski et al. | |
| 2006/0174179 A1* | 8/2006 | Visvanathan | H04B 1/7172 714/758 |
| 2008/0274700 A1* | 11/2008 | Li | H04L 1/0003 455/67.11 |
| 2011/0228740 A1 | 9/2011 | Axelsson et al. | |
| 2012/0163208 A1 | 6/2012 | Kamble et al. | |
| 2012/0314588 A1 | 12/2012 | Nammi | |
| 2012/0314607 A1* | 12/2012 | Craig | H04W 52/241 370/252 |
| 2013/0083710 A1* | 4/2013 | Chen | H04W 72/042 370/281 |
| 2013/0182569 A1* | 7/2013 | Bertrand | H04L 1/0009 370/232 |
| 2014/0126467 A1* | 5/2014 | Lu | H04L 1/003 370/328 |

OTHER PUBLICATIONS

Preliminary Report on Patentability, International Application No. PCT/US2014/012208, mailed Jul. 30, 2015, 10 pages.
Link Adaptation Control in LTE Uplink, Pierre Bertrand, et al., IEEE 2012, 978-1-4673-1881-5/12.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 5

| Configuration | Normal cyclic prefix | | | Cell size (km) | Extended cyclic prefix | | | Cell (km) |
|---|---|---|---|---|---|---|---|---|
| | DwPTS | GP | UpPTS | | DwPTS | GP | UpPTS | |
| 0 | 3 | 10 | 1 | 101 | 3 | 8 | 1 | 84 |
| 1 | 9 | 4 | 1 | 37 | 8 | 3 | 1 | 32 |
| 2 | 10 | 3 | 1 | 26 | 9 | 2 | 1 | 19 |
| 3 | 11 | 2 | 1 | 15 | 10 | 1 | 1 | 7 |
| 4 | 12 | 1 | 1 | 5 | 3 | 7 | 2 | 82 |
| 5 | 3 | 9 | 2 | 80 | 8 | 2 | 2 | 19 |
| 6 | 9 | 3 | 2 | 26 | 9 | 1 | 2 | 7 |
| 7 | 10 | 2 | 2 | 15 | | | | |
| 8 | 11 | 1 | 2 | 5 | | | | |

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Figure 10

7.1.7 Modulation order and transport block size determination

To determine the modulation order and transport block size(s) in the physical downlink shared channel, the UE shall first

- read the 5-bit "modulation and coding scheme" field ($I_{MCS}$) in the DCI and second if the DCI CRC is scrambled by P-RNTI, RA-RNTI, or SI-RNTI then

- for DCI format 1A:
  o set the Table 7.1.7.2.1-1 column indicator $N_{PRB}$ to $N_{PRB}^{1A}$ from Section 5.3.3.1.3 in [4]
- for DCI format 1C:
  o use Table 7.1.7.2.3-1 for determining its transport block size.

else

- set $N'_{PRB}$ to the total number of allocated PRBs based on the procedure defined in Section 7.1.6.

if the transport block is transmitted in DwPTS of the special subframe in frame structure type 2, then set the Table 7.1.7.2.1-1 column indicator $N_{PRB} = \max\{\lfloor N'_{PRB} \times 0.75 \rfloor, 1\}$, else, set the Table 7.1.7.2.1-1 column indicator $N_{PRB} = N'_{PRB}$.

Figure 14

ADAPTIVE LINK ADAPTATION FOR WIRELESS COMMUNICATIONS

PRIORITY

This application claims the benefit of priority from U.S. Provisional Patent Application Ser. No. 61/754,929, entitled "Adaptive Link Adaptation for Wireless Communications" and filed on Jan. 21, 2013, which is fully incorporated herein by reference for all purposes to the extent not inconsistent with this application.

BACKGROUND

Field of the Application

The disclosure is directed to wireless communications and, more particularly, to adaptive link adaptation for wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min \{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

BRIEF DESCRIPTION OF THE DRAWINGS

FIG. 5 illustrates exemplary TD-LTE uplink (UL)/downlink (DL) configuration options according to certain embodiments;

FIG. 7 illustrates exemplary TD-LTE SSF configuration options according to certain embodiments;

FIG. 9 illustrates an exemplary 4-bit CQI table according to certain embodiments;

FIG. 10 illustrates an exemplary modulation and transport block size (TBS) index table for physical downlink shared channel (PDSCH) according to certain embodiments;

FIG. 14 illustrates exemplary modulation order and transport block size determination according to certain embodiments;

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Figure 1:
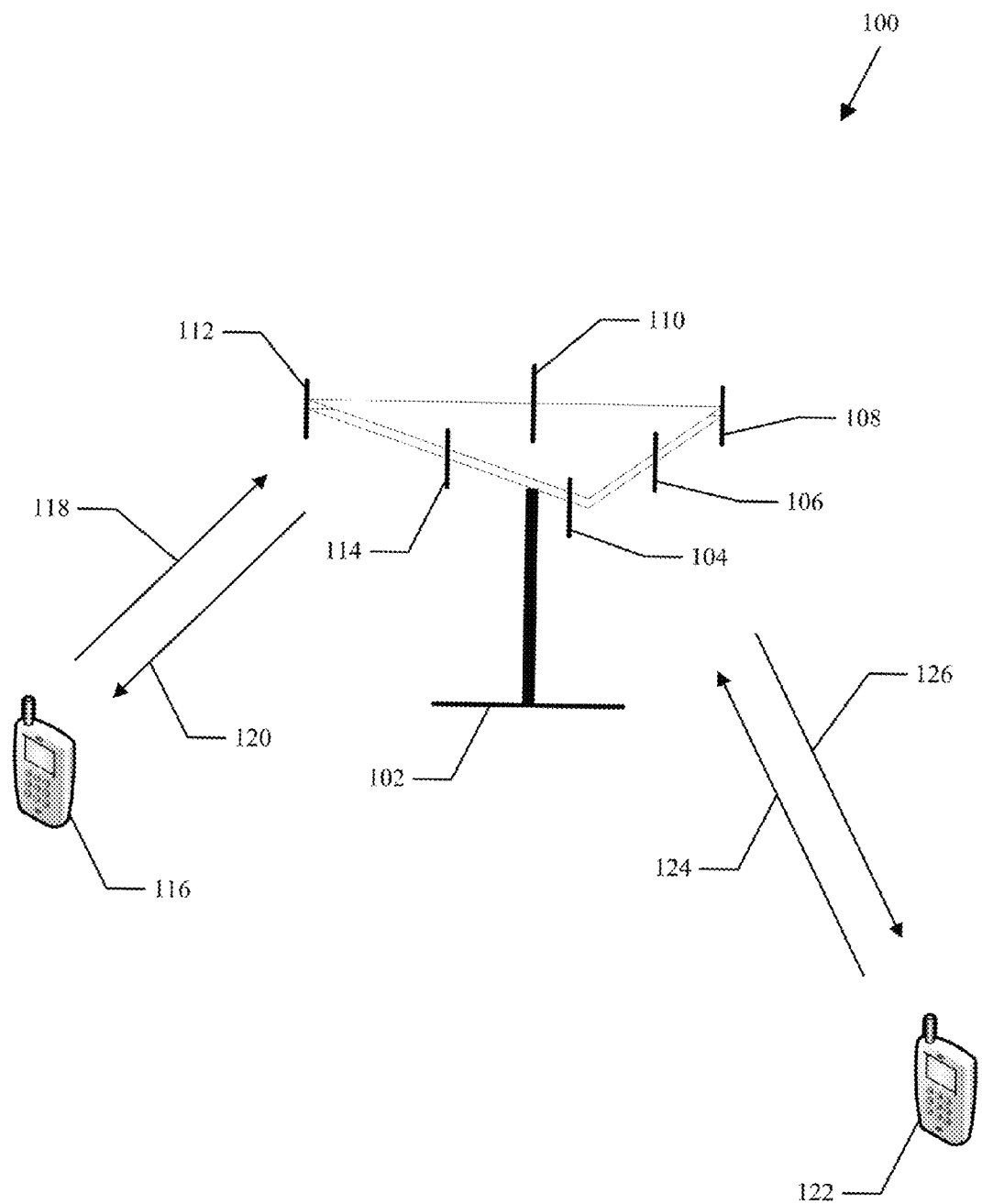
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequency for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
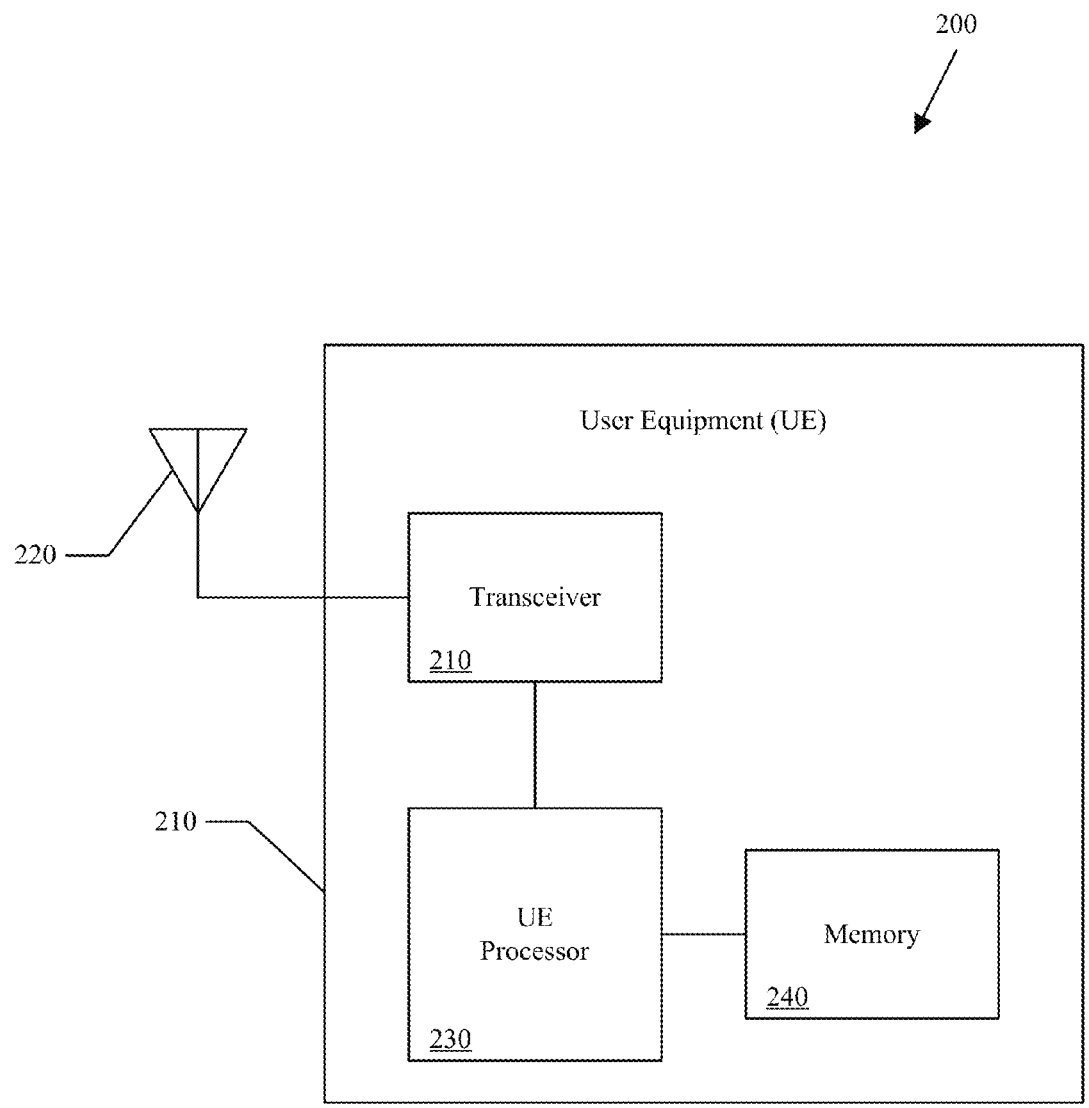
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 210, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 210 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
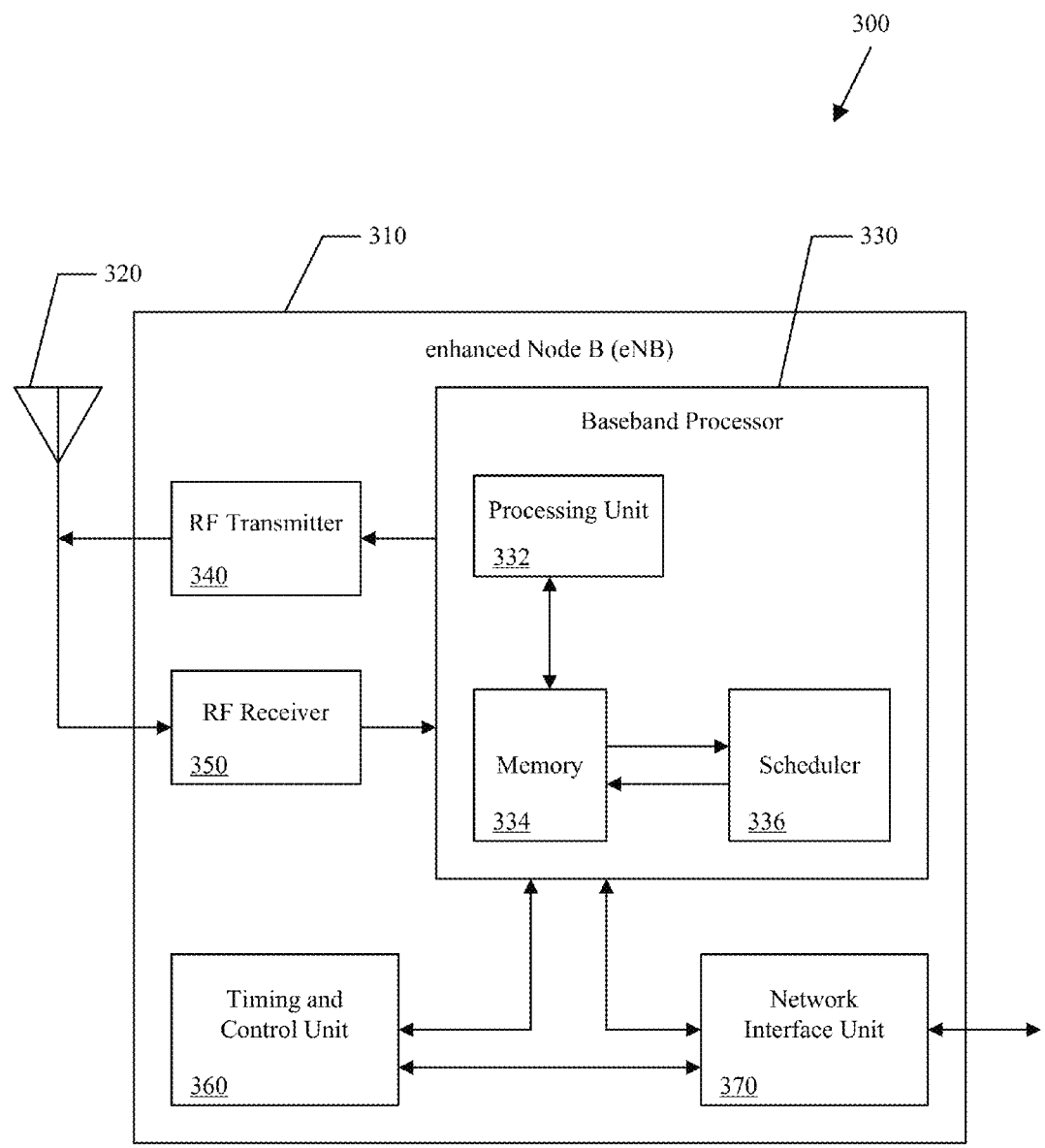
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 310 to provide radio communication with mobile handsets via a radio frequency (RF) transmitter 340 and RF receiver 330 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 320 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

In certain embodiments, the ideas of this application are presented in terms of time division duplex (TDD) Long-Term Evolution (LTE) (or together, TD-LTE). However, without loss of generality, certain embodiments can be extended to other wireless communication systems where some physical data channels or aspects of those physical data channels experience different code rates and/or channel estimation inaccuracy over time. Thus, the extension of the embodiments presented herein to those other wireless systems is intended to be within the scope of this application.

In TD-LTE, the uplink (UL) and downlink (DL) portions of a communication link are divided in time, as contrasted to FDD, which divided in frequency. Downlink and uplink portions are separated by a guard period, which is part of a special subframe (or S SF). The SSF consists of a DwPTS (downlink pilot time slot), the GP (guard period) and a UpPTS (uplink pilot time slot).

Figure 4:
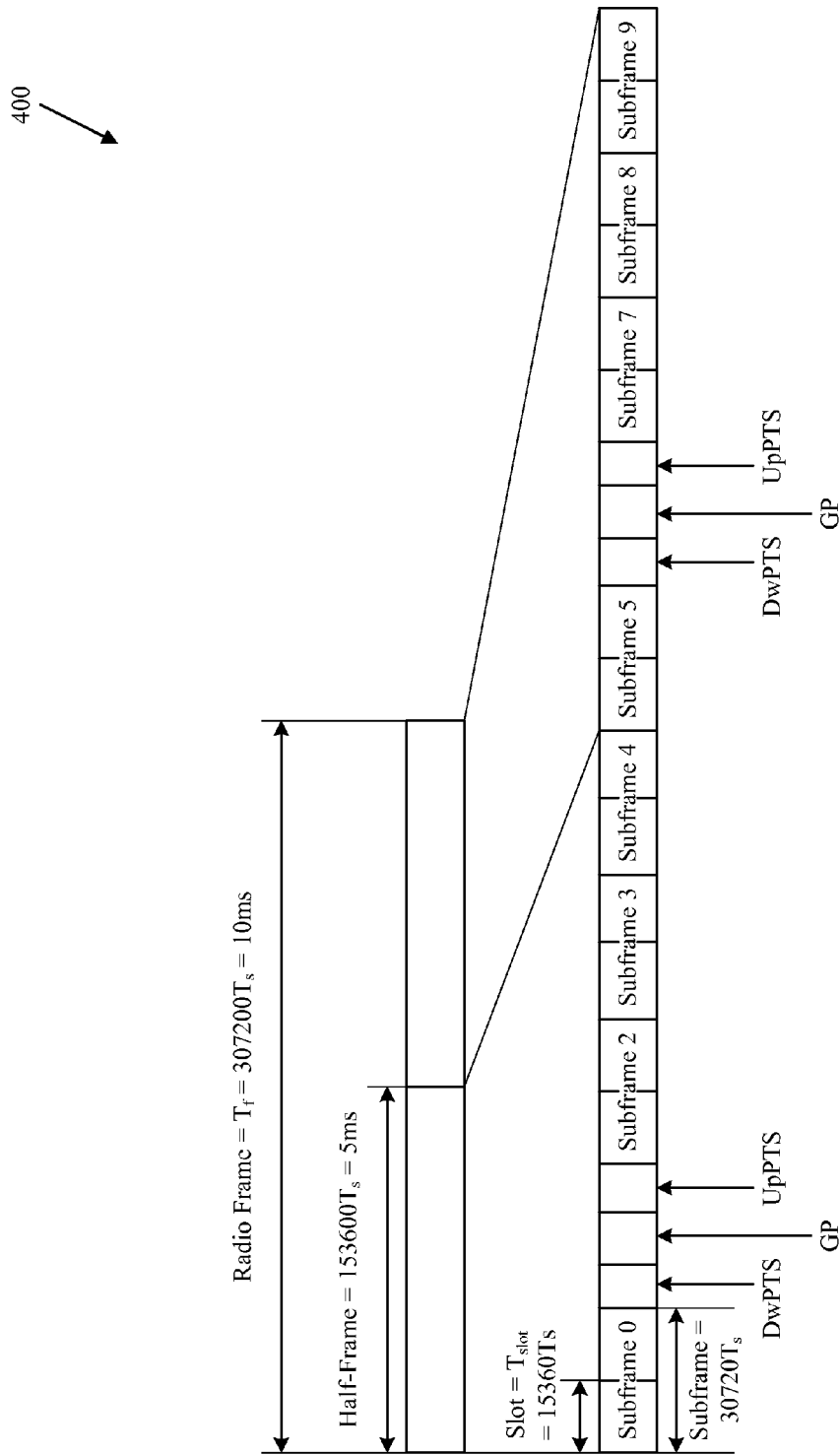
FIG. 4 illustrates an exemplary Time-Division Long-Term Evolution (TD-LTE) frame structure according to certain embodiments.

FIG. 4 illustrates an exemplary Time-Division Long-Term Evolution (TD-LTE) frame structure 400 according to certain embodiments. As shown in FIG. 4, ten TD-LTE subframes make up one radio frame. Of the ten subframes, two are special subframes (i.e., subframe 1 and subframe 6, as illustrated in FIG. 4). With the exception of subframes 0 and 5, which in TD-LTE are usually DL subframes, the non-special subframes can be configured to be either regular DL or UL subframes. However, there are numerous configuration options among the various subframes within a TD-LTE frame.

FIG. 5 illustrates exemplary TD-LTE uplink (UL)/downlink (DL) configuration options 500 according to certain embodiments. As shown in FIG. 5, "D" means regular DL subframes, "U" means regular UL subframes and "S" means special subframes. Different configurations can have different ratios of UL and DL subframes, thus different supported throughput for UL and DL. As can be seen, DL subframes are not always consecutive, which poses possible challenges to DL channel estimation, while there is a gap filled with UL subframes and a special subframe. Depending on the Doppler shift (discussed in more detail elsewhere in this application), channel states between two non-consecutive DL subframes can vary accordingly.

Figure 6:
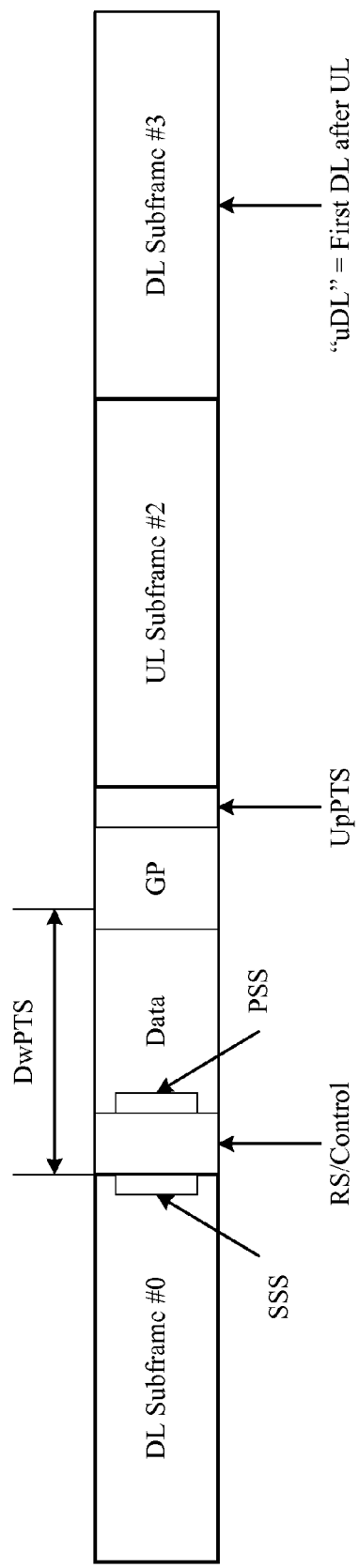
FIG. 6 illustrates an exemplary special subframe (SSF) in TD-LTE according to certain embodiments.

FIG. 6 illustrates an exemplary special subframe (SSF) 600 in TD-LTE according to certain embodiments. The SSF serves as a switching point between DL to UL transmission. As shown in FIG. 6, there exist at least three main areas of the SSF: the DL pilot time slot (DwPTS), the guard period (GP) and the UL pilot time slot (UpPTS).

In certain embodiments, the DwPTS is treated as a regular but shortened downlink subframe. As a result, it can contain reference signals and control information like a regular downlink subframe, and may carry some data transmission at the discretion of the scheduler. In addition, it also contains the primary synchronization signal (PSS) used for downlink synchronization. The secondary synchronization signal (SSS) is transmitted on the last symbol of subframe 0 (or subframe 5, when a SSF is transmitted as subframe 6, or any immediately-prior subframe of an SSF). The DwPTS can also contain cell specific reference signals (RS) (which can be similar to FDD), physical DL control channel (PDCCH) (1 or 2 symbols), PSS, as previously mentioned, on the 3rd symbol of subframe 1 (or 6), PCFICH and PHICH (same as in FDD) and possibly PDSCH on remaining resource elements (REs).

FIG. 7 illustrates exemplary TD-LTE SSF configuration options 700 according to certain embodiments. As shown in FIG. 7, the larger the GP, the larger the cell size, for those options where the UpPTS is allocated only one symbol, no random access can occur and only SRS can be transmitted.

Also shown in FIG. 7 is a guard period (GP), which denotes the switching point between downlink to uplink transmission and can be designed to absorb the DL to UL transition as well as the round trip delay and delay spread. The guard period length determines the maximum supportable cell size (or, vice versa), the bigger the GP, the larger cell size.

The UL pilot time slot (UpPTS) duration can have two values (one or two OFDM symbols). As a result, UpPTS usage by the UE is limited to either sounding reference signals (SRS) or random access channel (RACH) transmission. Random access requires UpPTS length of two OFDM symbols. When one OFDM symbol is allocated to the UpPTS, only SRS transmission is possible. Random access on the UpPTS is limited by the length of the UpPTS and therefore not applicable to all deployment scenarios. There is no physical UL control channel (PUCCH) and physical UL shared channel (PUSCH) as part of the UpPTS.

Figure 8:
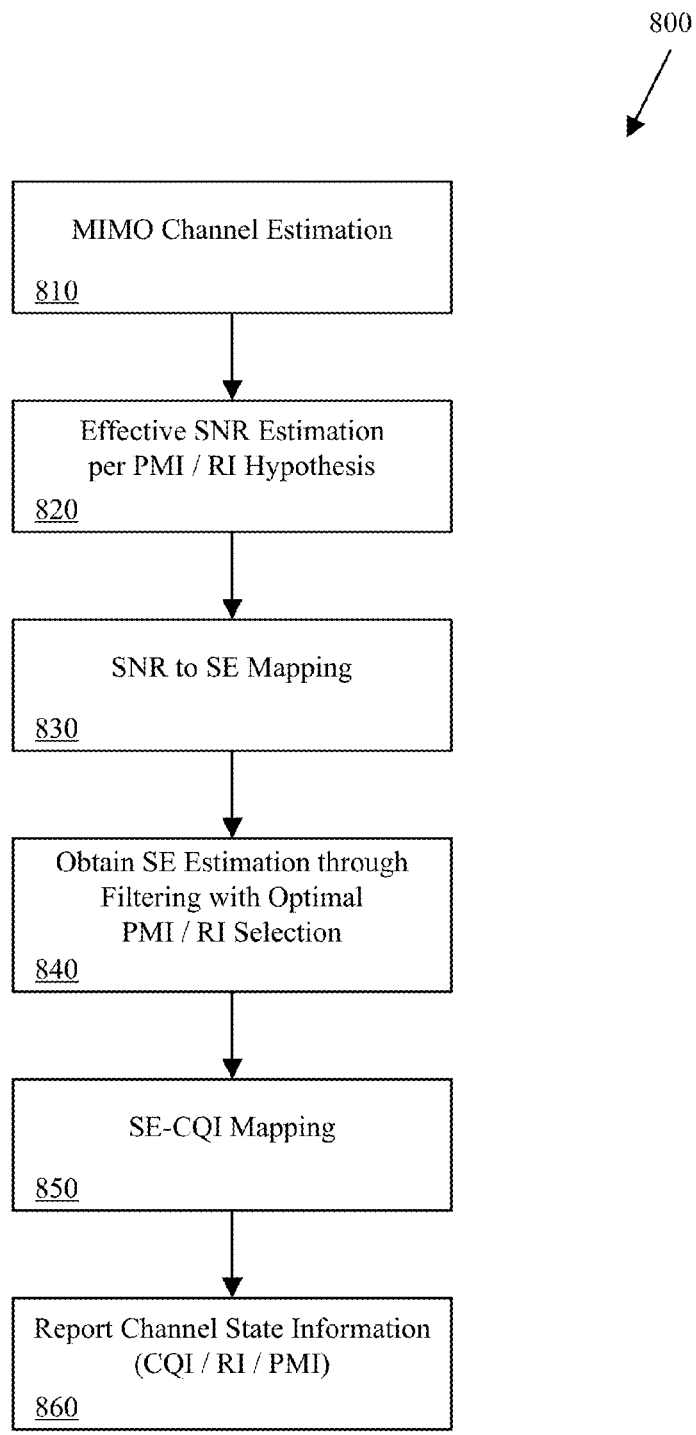
FIG. 8 illustrates an exemplary high-level channel state feedback (CSF) flow according to certain embodiments.

FIG. 8 illustrates an exemplary high-level channel state feedback (CSF) flow 800 according to certain embodiments. As used herein, CSF means the feedback (or the act of feeding back) to an originating terminal some channel state information (CSI), as determined by the received terminal after (or at) the time of reception of some information from the originating terminal, that provides the originating terminal with an indication of the state (or perceived state) of the reception channel at (or just after) the time the receiving terminal received the information from the originating terminal.

As shown in FIG. 8, the flow begins at step 810 with a MIMO channel estimation being performed on a received transmission. Next, at step 820, an effective signal to noise ratio (SNR) estimation is performed per precoding matrix indicator (PMI) and/or rank indication (RI) hypothesis. Note that other, similar SNR calculations are viable at 820. At step 830, the SNR is mapped to spectral efficiency (SE). At step 840, an SE estimation is obtained through filtering with "optimal" PMI and RI selection. At step 850, the SE estimation is mapped to a channel quality index (CQI). At step 860, the CSI is reported back (i.e., this is the feedback of CSF) to the originating transmitter (i.e., to the eNB from the UE, if the UE is the receiving terminal, as discussed in more detail herein). As shown in FIG. 8, in LTE, the CSF report can include the following three components: channel quality indicator (CQI), precoding matrix index (PMI), and rank indication (RI), and together making up the channel state information (CSI).

FIG. 9 illustrates an exemplary 4-bit CQI table 900 according to certain embodiments. CQI is defined as follows: based on an unrestricted observation interval in time and frequency, the UE (or more generally, the receiving terminal) shall derive for each CQI value reported in uplink subframe n the highest CQI index between 1 and 15 of table 900 of FIG. 9 that satisfies the following condition, or CQI index 0 if CQI index 1 does not satisfy the condition. The CQI determination condition is: a single PDSCH transport block with a combination of modulation scheme and transport block size corresponding to the CQI index, and occupying a group of downlink physical resource blocks termed the CQI reference resource, could be received with a transport block error probability not exceeding some value, for example: 0.1 (i.e., BLER<=10%).

PMI is defined as the precoding matrix index that the UE can feedback to the eNB for its selection of precoding matrix in an attempt to optimize throughput. The UE usually determines the optimal PMI based on its channel estimation and calculates the expected throughput with available hypotheses of precoding matrices. RI is defined as the indicator that signals the transmitting terminal (e.g., eNB) the number of transmission layers (i.e., multi-antenna transmissions) the UE can support to optimize throughput.

In LTE, the modulation and coding schemes (MCS) are defined to allow different levels of coding rates and modulation orders. FIG. 10 illustrates an exemplary modulation and transport block size (TBS) index table 1000 for physical downlink shared channel (PDSCH) according to certain embodiments. The TBS index used in transport block size tables is defined in the LTE specification(s) and/or texts and not defined further in this application.

Based on the CQI definition for LTE, from the UE perspective, the UE needs to achieve the 10% BLER target for any CQI given a particular DL configuration (and associated channel conditions, Doppler frequency, etc.). And the scheduling algorithm in the base station (BS, eNB, etc.) can be designed according to this UE requirement to try to optimize the throughput. Note that what is proposed in the LTE specification is one way of reporting and using CQI for optimizing the receiver throughput, which sets a fixed BLER target for the UE that can simplify the optimization at the BS. However, in order to further optimize, an adaptive BLER target can be used based on the UE channel conditions and network scenarios. Note that in this application, the disclosure will focus on the fixed BLER target for CQI, but the procedure(s) can be generalized to include and be applied to varying BLER targets for CQI. Also note that for MIMO transmissions, multiple hypotheses of the precoding matrices and rank selection (the number of spatial layers) can be tried by the UE to determine the optimal precoding matrix index (PMI) and rank indication (RI).

The procedure of CQI calculation can be described as previously discussed with reference to FIG. 8. First, through the channel estimation and noise estimation, the whitened channel estimation matrix can be obtained for CQI calculation. In order to get to the CQI estimation, the effective SNR estimation is performed based on the whitened channel matrix and the receiver algorithm. Generally speaking, there are several types of receiver demodulation algorithms including LMMSE (linear minimum mean square error), MLM (maximum likelihood method), and LMMSE-SIC (LMMSE with serial interference cancellation); but other algorithm can be used. Then, the estimated SNR value is mapped to an estimated spectral efficiency (SE) metric considering the channel capacity and possible loss due to practical receivers. Note that the SE estimation can be done in a finer granularity on a smaller number of resource blocks (RBs) (e.g., such as 2 RB). Then, the subband SE will be averaged across the wideband and filtered over time to have a wideband (WB) estimation of SE. The final step is to map the SE estimation to a certain CQI value to be reported back to the BS, or eNB.

The filtering of SE is important for CQI/PMI/RI reporting and it reflects how fast the UE responds to the channel or related spectral efficiency changes. The filtering mechanisms can include, for example, finite impulse response (FIR), infinite impulse response (IIR), and others. FIR filtering has a fixed length of memory and is a weighted sum of previous SE estimations. IIR filtering has a memory of theoretically infinite length with the impact of each sample exponentially decreasing, which general provides a smooth weighted average across a certain time. A simple IIR filter would be a single-pole IIR filter and the time constant can be approximated as the inverse of the IIR filter coefficient.

Furthermore, the CQI report requested by (or sent to) the eNB includes a wide-band (WB) or an M-subband report. The WB report requires the UE to report an averaged WB estimation of CQI. The M-subband CQI report mode specifies the UE to report the subband CQIs on M different subbands with defined number of RBs (e.g., each RB containing 12 tones in the LTE context with 180 kHz bandwidth). In order to respond to different CQI report modes, the SE averaging or filtering can be done in frequency domain accordingly.

Figure 11:
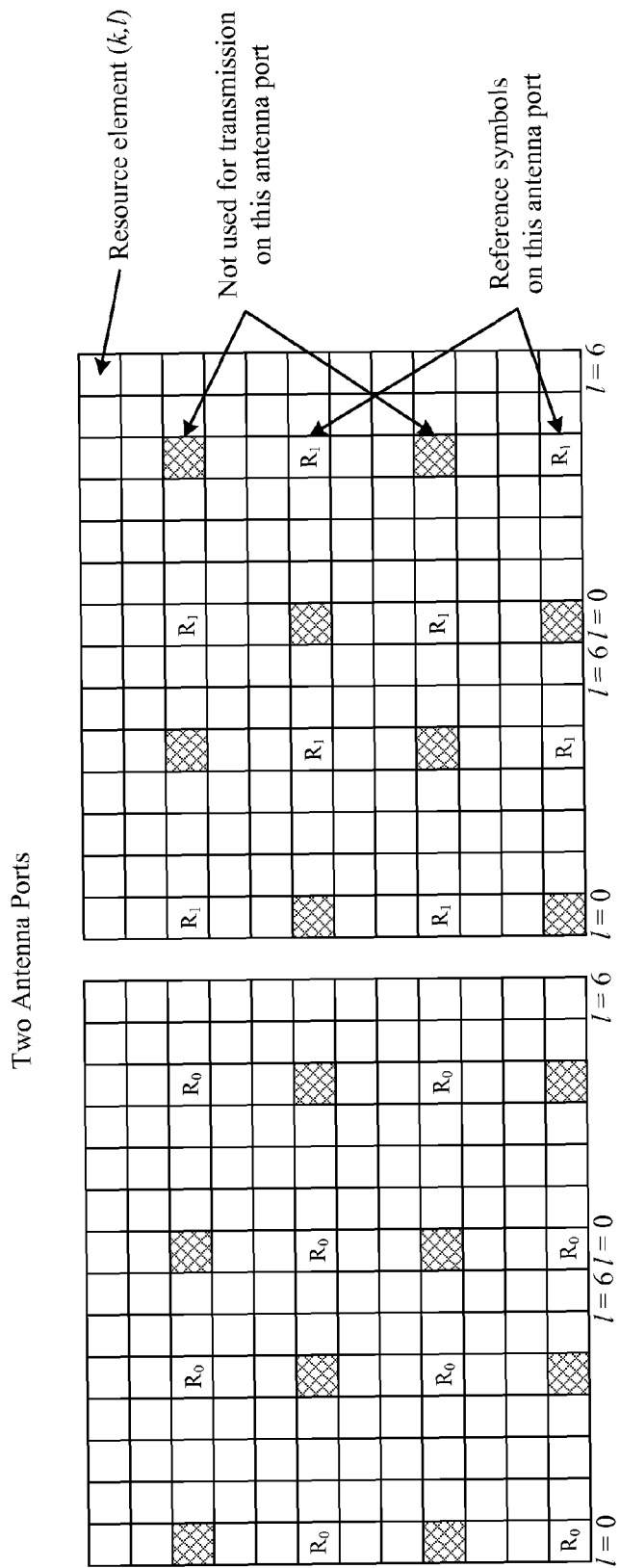
FIG. 11 illustrates an exemplary reference signal (RS) symbol structure for a dual antenna configuration according to certain embodiments.
Figure 12:
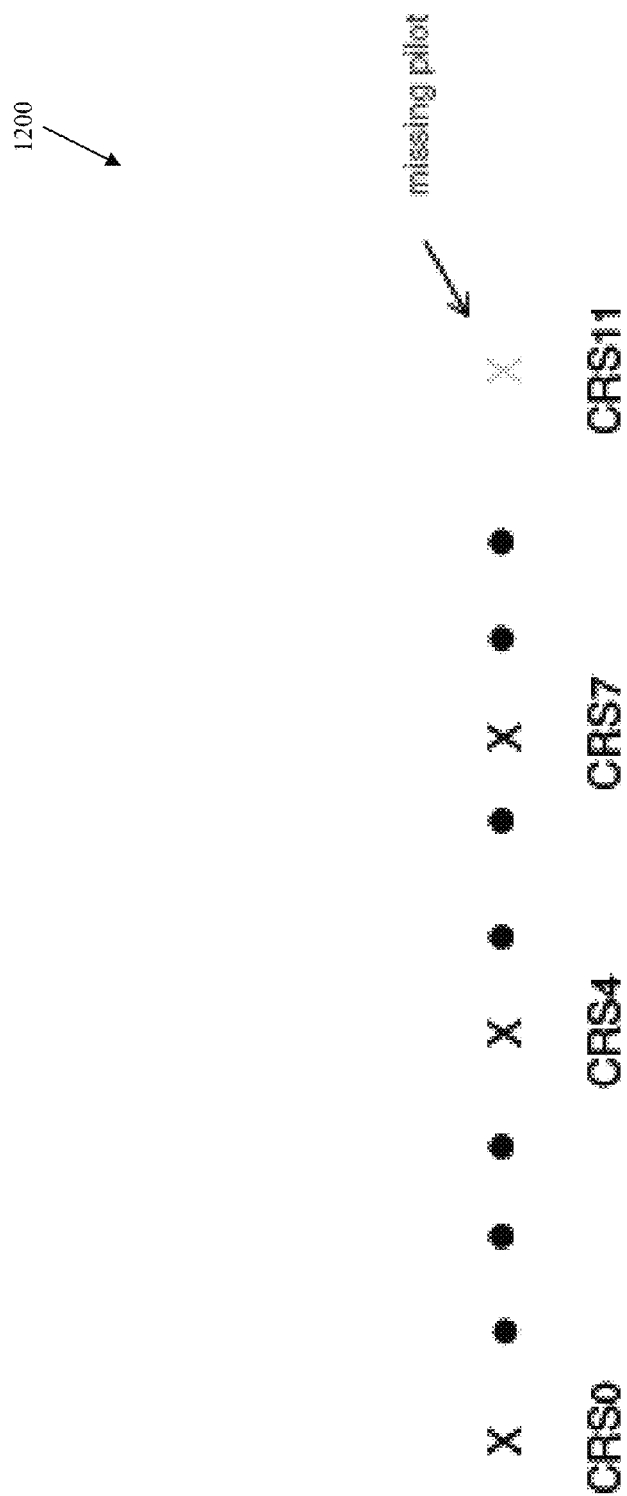
FIG. 12 illustrates exemplary reference signal (RS) in a special subframe (SSF) according to certain embodiments.

FIG. 11 illustrates an exemplary reference signal (RS) symbol structure 1100 for a dual antenna configuration according to certain embodiments. As shown in FIG. 11, for an SSF, not all RS symbols are available for SSFs in several SSF configurations. For example, for SSF configuration option 7 (10 data symbols), only 3 RS symbols are available in the SSF for channel estimation. FIG. 12 illustrates exemplary reference signals (RS) in a special subframe (SSF) 1200 according to certain embodiments. Additionally, channel estimation may be inaccurate in the scenarios of high Doppler channel conditions (discussed in more detail elsewhere in this application). The phase and amplitude of the channel varies fast especially in high Doppler scenarios. The inaccuracy of the channel estimation can lead to cyclic redundancy check (CRC) error of DL subframes for high modulation orders (e.g., 64 QAM), which can result in the UE reporting a NACK (or similar-type message) to the base station to indicate the CRC error. Some techniques can be applied to mitigate the channel estimation inaccuracy such as extrapolation. However, due to the fact that the last RS symbol is missing in certain SSFs (as shown in FIG. 12), performance degradation can be expected.

Figure 13:
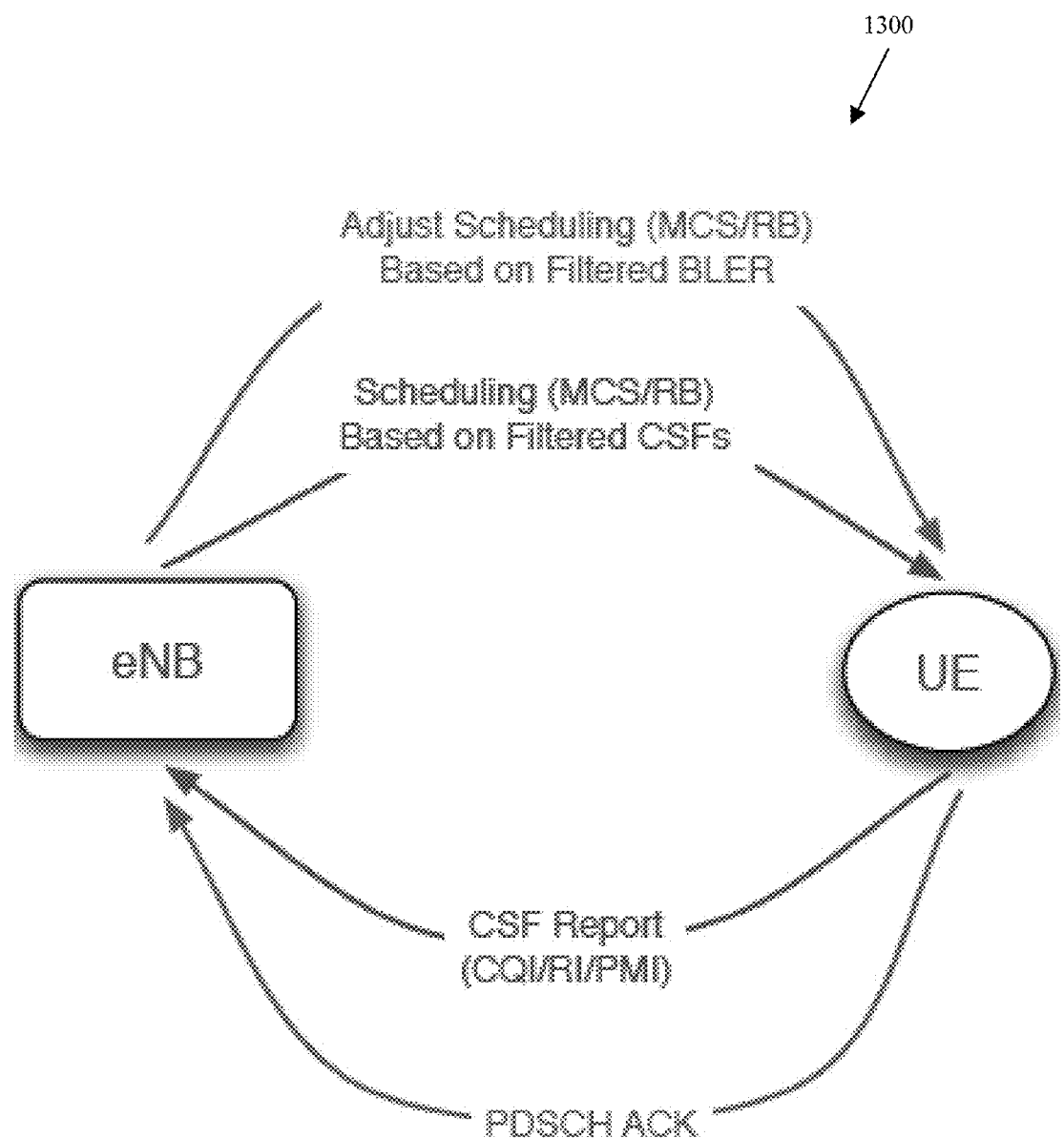
FIG. 13 illustrates an exemplary diagram for inner-loop and outer-loop link adaptation according to certain embodiments.

FIG. 13 illustrates an exemplary diagram for inner-loop and outer-loop link adaptation (LA) 1300 according to certain embodiments. Link adaptation (LA) is a general function in wireless networks and plays a role in the 3GPP Long Term Evolution (LTE) wireless networks. LA attempts to estimate the most appropriate modulation order and coding rate to be used at a given time on a radio link to meet a target criterion, such as block error rate (BLER). LA use can facilitate better utilization of the instantaneous capacity of a wireless network as actual wireless channels can be time-varying and frequency-selective. Link adaptation consists of comparing channel state indications from user equipment (i.e., which can be indicative of the signal to interference plus noise ratio (SINR) for that UE) with one or more switching thresholds that partition the locally-optimum modulation and coding schemes (MCS) to select the best MCS for that UE at that time given all (or perhaps a subset of) the constraints on the channel and in the cell. In certain embodiments, two aspects of LA are discussed: fast LA or inner-loop LA, and slow LA or outer-loop LA. The fast, inner-loop LA includes the fast MCS selection based on filtered CSFs and the slower, outer-loop LA includes the complementary slower threshold adaptation or adjustment based on filtered BLER.

For a given UE-provided channel condition (e.g., SNR, SINR, CSI, etc.) for that user at a certain transmission interval and for a particular frequency chunk consisting of a number of physical resource blocks (PRBs), the slower, inner-loop LA estimates the optimal MCS out of a fixed MCS set that can be assigned to the user for a future transmission interval. The RB allocation size and MCS index provide the transport block size (TBS) that yields, or can be used instead of, the maximum instantaneous data rate currently achievable by that user on that particular frequency chunk. This inner-loop link adaptation (LA) can be driven by two different requirements, which depend on the type of traffic being served: 1) for time sensitive traffic (e.g., VoIP, certain messages, etc.) the LA strategy can be to maximize the throughput under the constraint of not exceeding a target BLER; and 2) for non-time sensitive traffic (e.g., ad-hoc users, etc.) the LA strategy can be to maximize the throughput, without any BLER constraint.

Thus, in an LTE inner-loop LA system, the UE does the CSF estimation based on the channel estimation on the downlink pilot signals and reports these data back to the eNB. The eNB can then schedule the downlink grants to the UE with corresponding MCS, number of RBs and MIMO types. However in real systems, the instantaneous channel state values provided by the UE to the eNB as part of the inner-loop LA undergo a feedback delay, estimation errors, as well as varying channel statistics, such that the inner-loop thresholds also need to be adapted to track and mitigate these imperfections. This leads to the slower, outer-loop link adaptation.

The inner-loop LA prediction errors can be addressed by applying a back-off to the UE channel state estimates at the inner-loop LA input. This back-off can be adapted in the outer-loop at a slower rate and independently for each UE. In LTE FDD, outer-loop algorithms can use HARQ signaling results to estimate the achieved UE BLER and adapt the back-off accordingly. In LTE TDD, outer-loop algorithms can use ACK/NACK signaling results to estimate the achieved UE BLER and adapt the back-off accordingly.

Generally speaking, there is a BLER target to be maintained by the eNB, which can vary for different channel scenarios (e.g., Doppler dependent). And the CSF estimation at the UE may not always be reliable. Therefore, the eNB can filter the UE BLER, based on which it can adjust the MCS/MIMO type it schedules for using for that UE. The BLER filtering can be implemented in different fashions: IIR filtering the CRC errors, block-wise moving average and so on.

Hysteresis can be applied to the BLER targets when the average BLER changes are large enough to trigger the MCS adjustment. For instance, in LTE, the MCS (it determines the code rate, the higher the MCS the higher code rate) can be adjusted based on the filtered BLER fluctuation. Also, the step size of MCS adjustment can be considered. To have a stable outer loop, the step size for MCS when adjusted up is usually smaller compared to the step size for MCS when adjusted down. Generally, the outer-loop filters the BLER from all DL data subframes with no distinction of the DL subframe specifics; that is, with no distinction between SSFs or regular DLs, as in TD-LTE.

Due to UE channel estimation challenges for SSFs, given that the code rate is the same for the SSFs and the regular DL subframes, because when the eNB LA outer loop is only run based on the overall BLER filtering, it can feedback the scheduled grants that are too aggressive for SSFs (i.e., leading to too high of a DL BLER and lower throughput on SSFs). This also means that the scheduling grants may be too conservative for regular DL subframes, because the average BLER obtained at the eNB also includes the BLER calculated from SSFs, which can also lead to non-optimized link adaptation hence lower throughput on regular DL subframes FIG. 14 illustrates exemplary modulation order and transport block size determination according to certain embodiments. For different special subframe configurations, the number of reference symbols can be different. Given a certain MCS, only scaling the number of RBs by a fixed ratio of 0.75 (as shown in FIG. 14), can lead to different effective code rates of the downlink transport block in the special subframe (as contrasted to other SSF configurations and/or to regular DL subframes). This can be challenging to outer loop LA algorithm(s) considering the code rate of SSF may need to be different from each other (configuration-wise) and from regular DL subframes.

Figure 15:
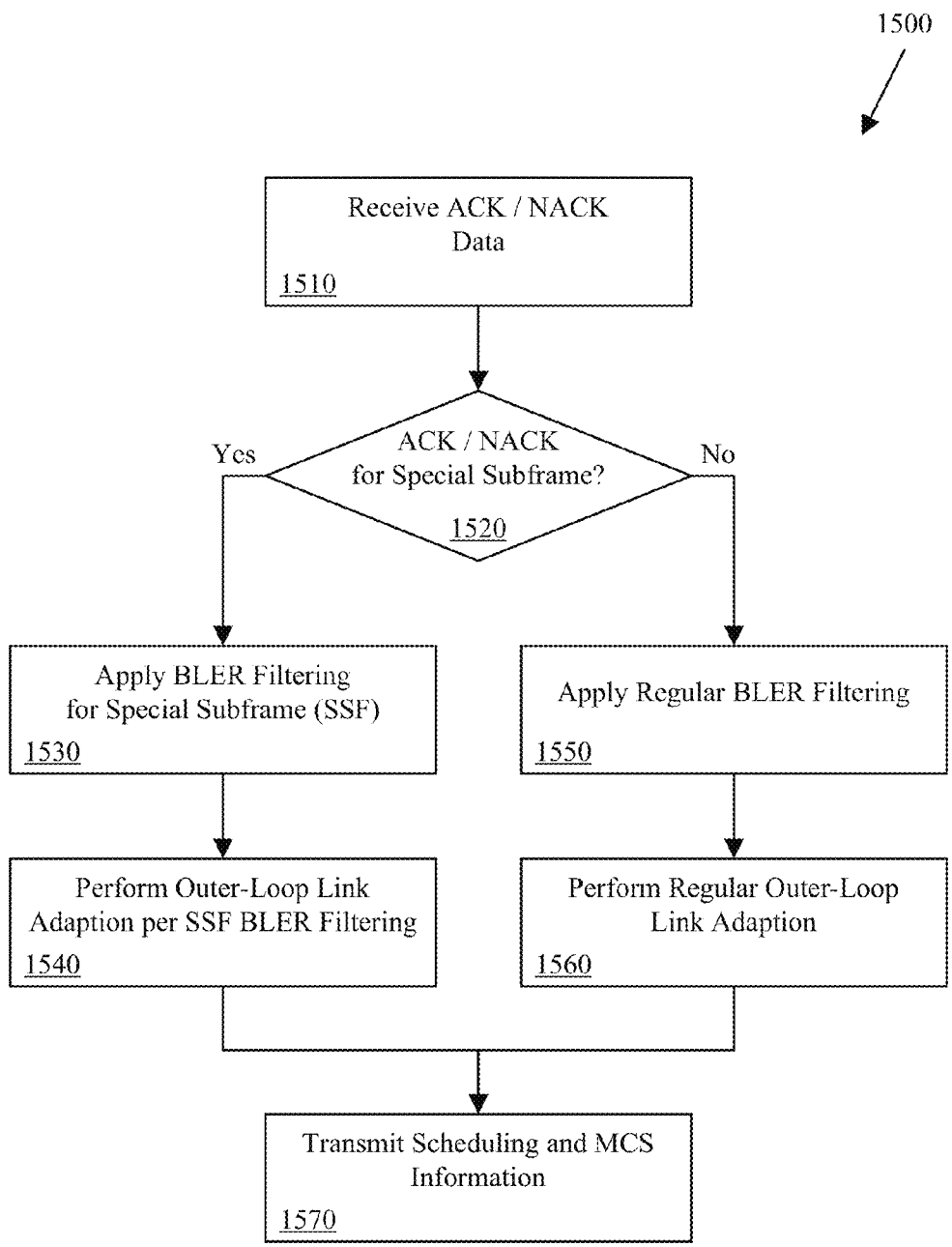
FIG. 15 illustrates an exemplary flow for adaptive link adaptation (LA) at an eNB in a TD-LTE system according to certain embodiments.

FIG. 15 illustrates an exemplary flow 1500 for adaptive link adaptation (LA) at an eNB in a TD-LTE system according to certain embodiments. Generally, and not shown in FIG. 15, a receiving device has been transmitted a subframe, and the transmitting device has received some sort of responsive message indicating whether the receiving device successfully received and/or decoded/demodulated the subframe. In TD-LTE terms, the receiving device may be a UE, the subframe may be a SSF or a regular DL subframe, the transmitting device may be an eNB and the responsive message may be an ACK/NACK signal or message.

As shown in FIG. 15, the process begins at step 1510 with receiving the ACK/NACK data (or similar), which indicates whether a particular subframe that was previously transmitted was successfully received. In certain embodiments, at decision 1520, the eNB determines whether the received ACK/NACK data (or similar) is for a special subframe (SSF) or for a regular DL subframe. If for a SSF, then at step 1530 BLER filtering is applied for the SSF. This SSF BLER filtering may be performed, generally, in a number of ways, with the exception that not all subframes are taken into account. For the SSF BLER filtering, only SSFs are taken into account and not the regular DL subframes. Additionally (and not shown in FIG. 15), step 1530 can be broken down farther, such that each different type of SSF can have BLER filtering applied independently of the other types (and of the regular DL subframes).

In response to the SSF BLER filtering, at step 1540, SSF outer-loop LA can be performed. Thus, in certain embodiments, the scheduling on the SSF (or on each type of SSF) can be made specific to the needs of the SSF in an attempt to increase the possible throughput on the SSFs. In this way, the same step size adjustment criteria can be used for all types of subframes (but does not have to be), but since the SSF is going through BLER filtering separately (i.e., SSF-specific BLER filtering), the adjustments can be different than for regular DL subframes (or for other various types of SSF). Additionally (or alternatively), considering the sensitivity (or lack thereof) of the channel estimation algorithms on SSFs due to the potentially fewer number of RS symbols, the step size for adjusting the MCS (code rate) during the outer-loop LA of SSFs can be designed differently from the other-loop LA with regular DL subframes (or even between different configurations of SSFs). For example, compared to outer-loop LA for regular DL subframes, the step size for adjusting MCS down for the SSF can be bigger when the filtered BLER is above the BLER target (with hysteresis considered); and similarly, the step size for adjusting MCS up for the SSF can be smaller when the filtered BLER is below the BLER target (with hysteresis considered).

As already eluded, at step 1550, if the received ACK/NACK (or similar) is not for a SSF, then regular BLER filtering can be applied (i.e., for all of the non-SSF DL subframes). At step 1560, in response to the regular BLER filtering, regular outer-loop LA can be performed. However, this "regular" BLER filtering and subsequent outer-loop LA may not be taking into account the SSFs (although, they could). This will be non-SSF DL subframe-specific processing. Finally, at step 1570, all scheduling and MCS information can be transmitted.

In a dynamic propagation environment, Doppler estimation can be used to estimate the Doppler spread encountered by the UE as it moves with non-zero speed. Doppler spread is directly proportional to the channel time correlation. In other words, the faster an UE or mobile device moves, the larger the Doppler spread encountered and the smaller the channel correlation time. The information about how long a channel stays correlated can be important for proper filtering and processing of channel and noise estimation, which can directly impact DL demodulation of traffic and control channels.

In certain embodiments, there are multiple ways to estimate Doppler spread or Doppler frequency. Considering that the channel time auto-correlation has a direct relationship with the Doppler spread, instead of directly estimating the Doppler spread, a device can use a channel time auto-correlation estimate to perform Doppler spread classification into various Doppler spread regimes. Another method is to use maximum likelihood estimation based on the Doppler power spectral density. The Doppler power spectral density (PSD) of a fading channel describes how much spectral broadening it causes. A device can estimate its PSD using the channel estimation obtained from the pilot signals, and then estimate the Doppler shift based on maximum likelihood estimation of the expected Doppler PSD.

In certain embodiments, a base station, or eNB, may determine or estimate a Doppler frequency for a mobile device using a number of different methods, some of which are outlined below. Because speed of a mobile device in a communications network may directly relate to the rate of wireless mobile channel variations, knowledge of a mobile device's speed may allow improvement of system performance (e.g., more accurate channel prediction, better link adaptation, power control, etc.) in a multi-cell wireless communication system. A mobile device's speed reflects the rate of wireless mobile channel variations and, hence, is directly proportional to the mobile device's Doppler frequency (which represents such channel variations based on the relative speed between the mobile device and a base station). Speed estimation, or equivalently, Doppler frequency estimation, may be done based on signals received at the mobile unit and/or at a base station or other fixed station of a mobile communication network.

In certain embodiments, eNB 310 may estimate the Doppler frequency of UE 210 based on certain parameters obtained from, for example, uplink pilot or sounding reference signal (SRS) transmitted from UE 210 to eNB 310. These parameters include, for example, UE frequency locations (in case of frequency-selective scheduling), channel quality index (CQI), precoding matrix information (PMI), and so on. It is understood that the methodologies discussed herein work for any other parameters that can be similarly measured and used by a base station for mobile device Doppler frequency estimation.

Figure 16:
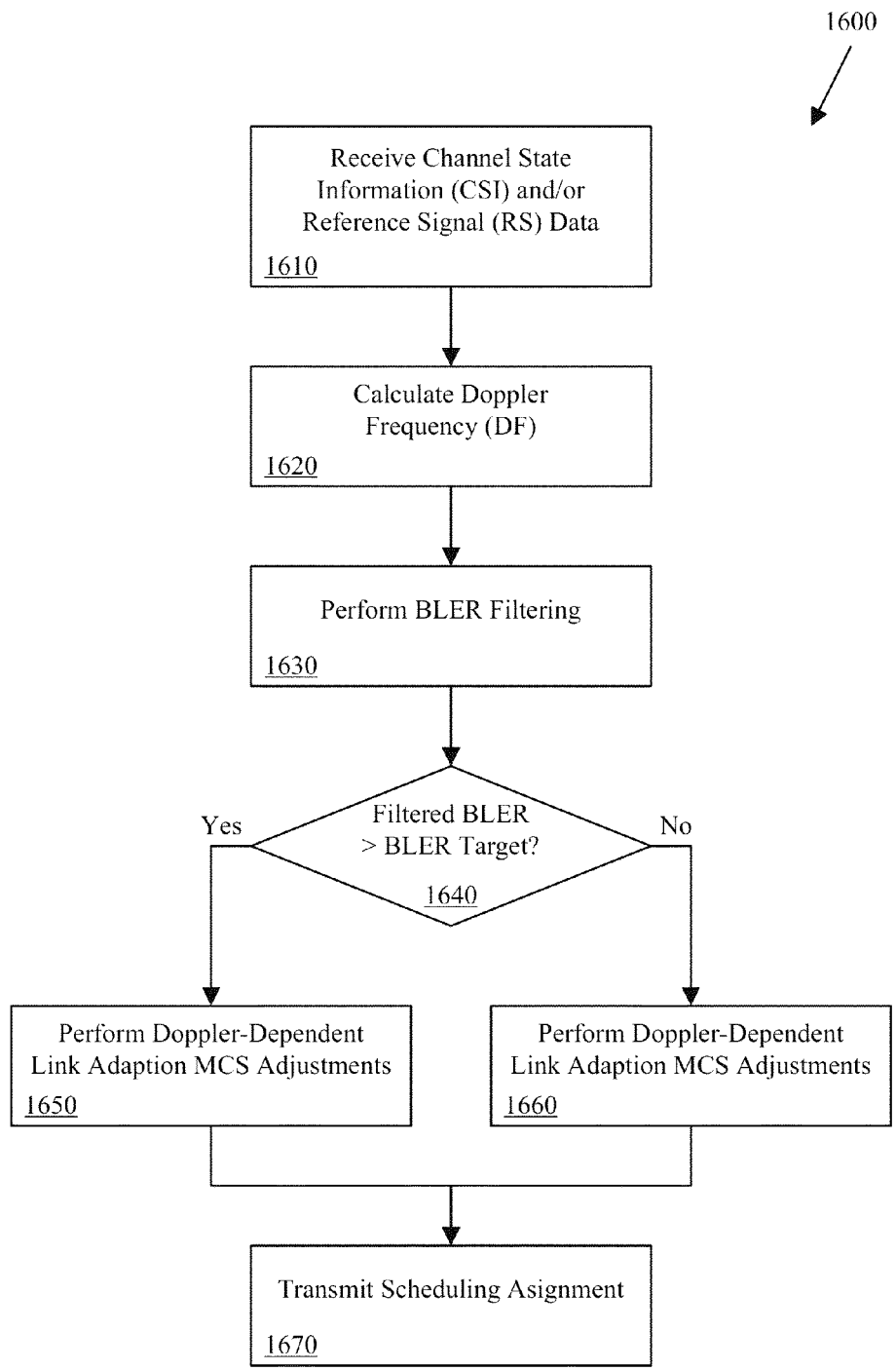
FIG. 16 illustrates an exemplary flow for Doppler-dependent link adaptation (LA) in a TD-LTE system according to certain embodiments.

FIG. 16 illustrates an exemplary flow 1600 for Doppler-dependent link adaptation (LA) in a TD-LTE system according to certain embodiments. In certain embodiments, the MCS step size adjustment can be Doppler dependent to help improve the outer-loop LA performance. As shown in FIG. 16, at step 1610, channel state information (CSI) and/or reference signal (RS) data are received. At step 1620, a Doppler frequency (or spread estimation) is calculated based at least on the received CSI and/or the RS. Next, at step 1630, BLER filtering is performed (with, or without, hysteresis considered). At step 1640, a determination is made whether the filtered BLER is greater than the BLER target. If it is greater, then at step 1650, the higher the Doppler the bigger the step size for adjusting the MCS lower. If it is not greater, then at step 1660, the higher the Doppler, the smaller the step size for adjusting the MCS higher. Finally, at step 1670, scheduling assignments (with Doppler-dependencies) can be transmitted. Even though FIG. 15 and FIG. 16 are shown and described separately, they can be combined into one all-encompassing methodology.

In certain embodiments, the UE channel estimation performance of SSFs due to the limitation of receiving fewer RS symbols, i.e., reference signal (pilot in LTE terminology), also can depend on the Doppler frequency of the UE (i.e., the movement of the UE relative to the eNB). In low Doppler scenarios, the channel varies slowly and even with fewer received RS symbols, the UE channel estimation can be reliable enough that there may not be any deterioration to the DL transport block demodulation and decoding. However, in high Doppler scenarios, the channel can vary fast (in both amplitude and phase), in which case, the channel estimation inaccuracies at the UE due to receiving a fewer number of RS symbols can be more noticeable and can introduce sizable performance losses.

Even though the above discussion has focused on TDD (for convenience purposes), the ides presented therein are equally applicable to other technologies. For example, in FDD LTE subframes 0 and 5, there are PBCH (physical broadcasting channel) and synchronization signals. The effective code rate of those subframes can be lower as compared to other, regular DL subframes when using the same MCS. Therefore, the eNB can improve the outer-loop LA if it runs selective BLER filtering and outer-loop LA for subframes 0 and 5 separately from the other regular DL subframes (as discussed in more detail herein).

Figure 17:
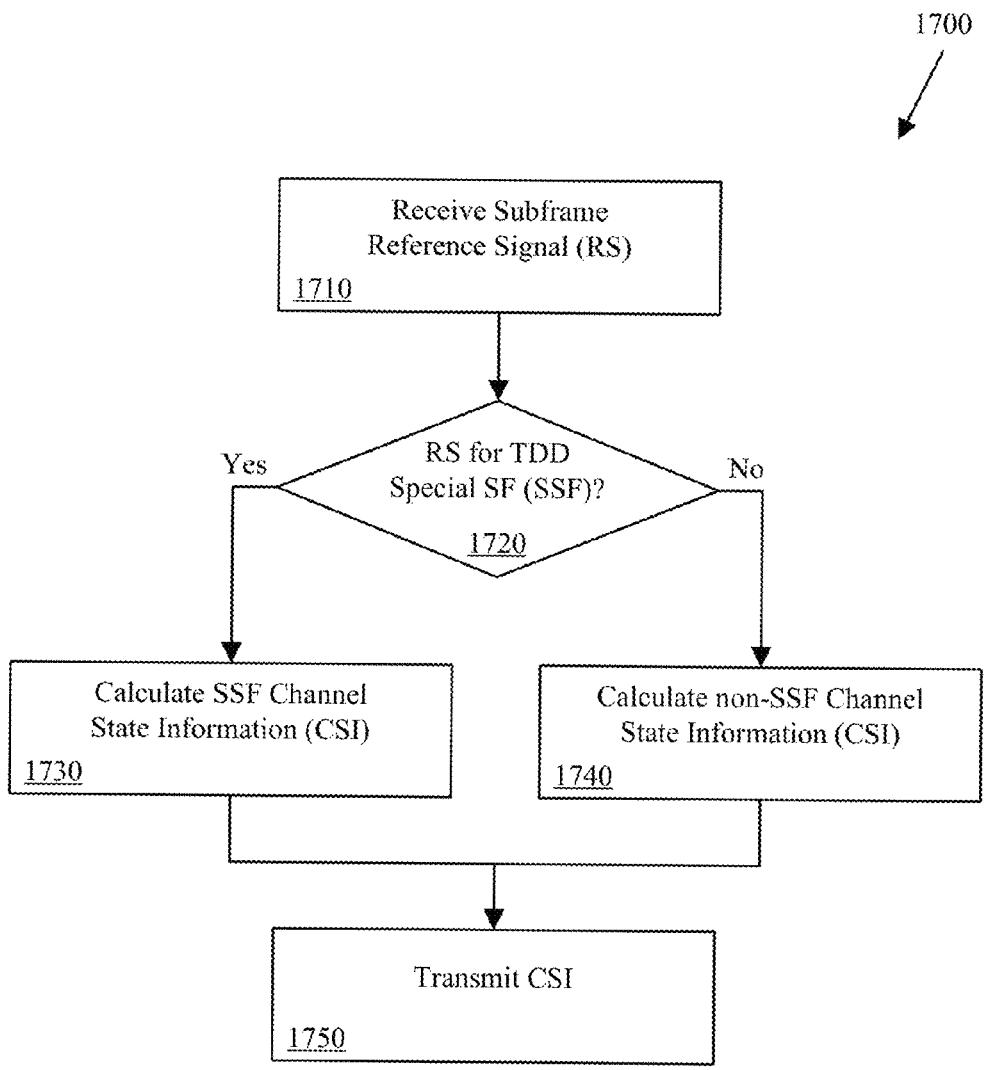
FIG. 17 illustrates an exemplary flow for subframe-specific channel state information determination in a UE according to certain embodiments.
Figure 18:
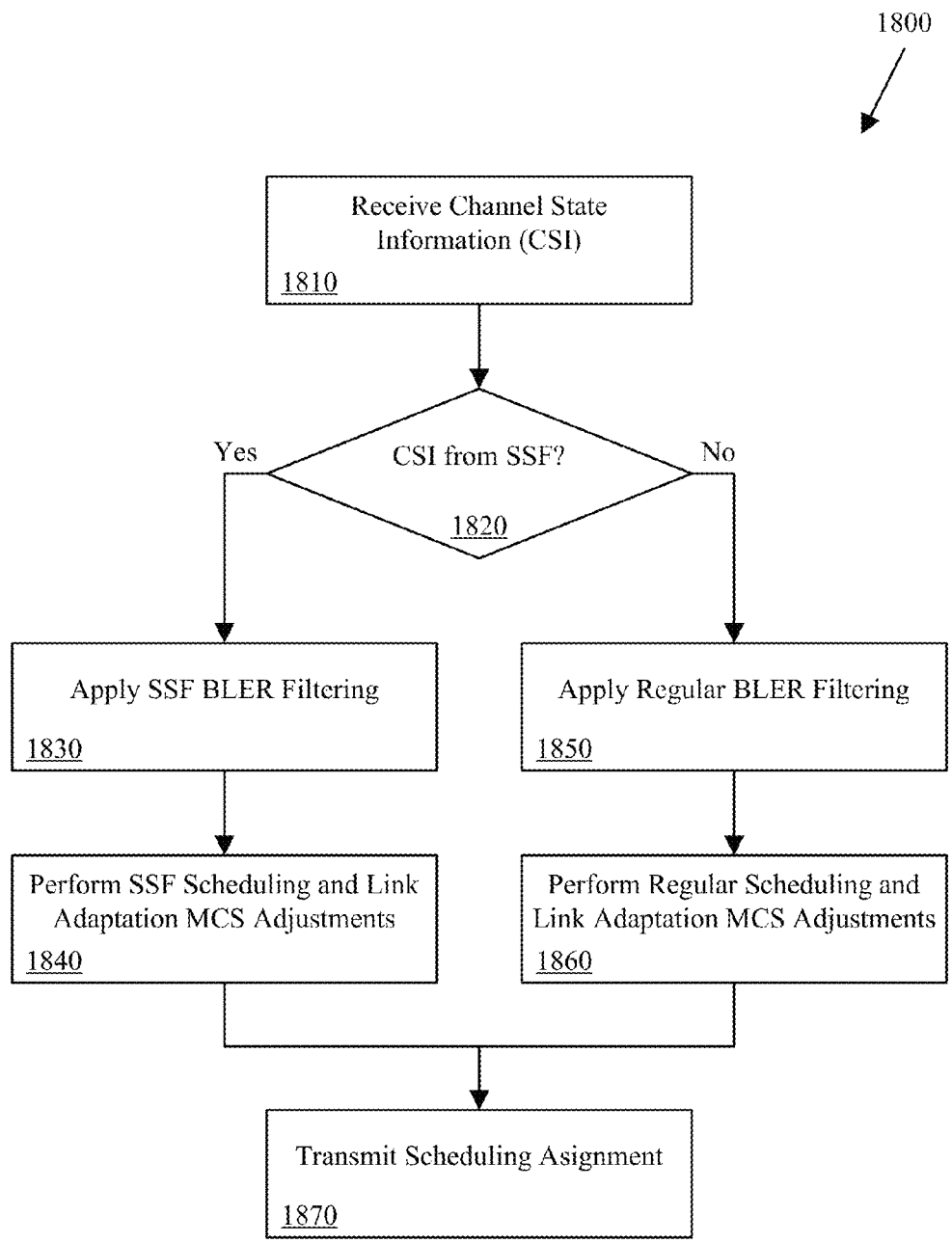
FIG. 18 illustrates an exemplary flow for processing subframe-specific channel state information in an eNB according to certain embodiments.

In certain embodiments, the UE can transmit subframe-type-specific CSI information to the eNB, in response to which the eNB can perform subframe-type-specific BLER filtering and outer-loop link adaptation. FIG. 17 illustrates an exemplary flow 1700 for subframe-specific channel state information determination in a UE according to certain embodiments. FIG. 18 illustrates an exemplary flow 1800 for processing subframe-specific channel state information in an eNB according to certain embodiments.

As shown in FIG. 17, at step 1710, the UE can receive a subframe, which includes a subframe reference signal (RS). At step 1720, the UE can determine whether the received subframe is a special subframe (SSF). If it is an SSF, then at step 1730, the UE can calculate SSF-specific CSI. If it is not an SSF, then at step 1740, the UE can calculate non-SSF (or regular DL subframe) CSI. Regardless of which type of CSI is calculated, at step 1750, the UE can transmit the CSI. Note that this transmission can include an indicator (1 or more OFDM symbols) that informs the eNB of which type of CSI has been transmitted.

As shown in FIG. 18 (which can generally be compared to the methodology of FIG. 15, with some differences), at step 1810, the eNB can receive CSI that can include an indicator for instructing the eNB for which type of subframe that particular CSI was derived. At step 1820, the eNB can check to decide whether the CSI is from an SSF. If from an SSF, then SSF-specific BLER filtering and scheduling/MCS LA adjustments can be performed. If not from an SSF, then regular BLER filtering and scheduling/MCS LA adjustments can be performed. The functions are similar to those discussed above with reference to FIG. 15. Finally, at step 1870, the scheduling assignments can be transmitted.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM.RTM., etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17, etc.) technology, as well as 3GPP2 (IxRTT, 1xEV-DO RelO, RevA, RevB, etc.) technology and other technologies, such as WiFi, WiMAX, WMBA and the like.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for performing link adaptation in a wireless communication system that includes a base station and at least one wireless device comprising:
   receiving at the base station a signal from the wireless device that is indicative of and responsive to a specific subframe type that was previously transmitted from the base station to the wireless device, wherein the specific subframe type is selected from one or more special subframes, wherein the special subframes serve as switching points between DL to UL transmission;
   performing subframe-type-specific block error rate (BLER) filtering based at least on the specific subframe type;
   performing subframe-type-specific outer-loop link adaptation (LA) based at least on the subframe-type-specific BLER filtering; and
   transmitting from the base station to the wireless device subframe-type-specific scheduling and modulation and coding scheme (MCS) information based at least on the subframe-type-specific outer-loop LA.

2. The method of claim 1, wherein the signal includes ACK / NACK data for the specific subframe type.

3. The method of claim 1, wherein the signal includes channel state information for the specific subframe type.

4. The method of claim 1, wherein performing subframe-type-specific outer-loop LA includes:
adjusting a subframe-type-specific step size of a subframe-type-specific MCS differently for different types of subframes.

5. The method of claim 4, wherein adjusting a subframe-type-specific step size includes:
for a first type of subframe, when the subframe-type-specific BLER filtering is above a subframe-type-specific BLER target, the subframe-type-specific step size is bigger than when the same condition is met for a second type of subframe, and
for the first type of subframe, when the subframe-type-specific BLER filtering is below the subframe-type-specific BLER target, the subframe-type-specific step size is smaller than when the same condition is met for the second type of subframe.

6. The method of claim 1, wherein performing subframe-type-specific outer-loop LA includes:
receiving at the base station a channel quality signal from the wireless device;
calculating a Doppler frequency based at least on the channel quality signal; and
performing the subframe-type-specific BLER filtering and the subframe-type-specific outer-loop LA to include a Doppler-dependency.

7. The method of claim 6, wherein performing the Doppler-dependent subframe-type-specific BLER filtering and the subframe-type-specific outer-loop LA include:
if the filtered BLER is greater than a BLER target, then the higher the Doppler frequency the bigger a step size for adjusting the MCS lower, and
if the filtered BLER is not greater than a BLER target, then the higher the Doppler frequency the smaller the step size for adjusting the MCS higher.

8. An apparatus for performing link adaptation in a wireless communication system that includes a base station and at least one wireless device comprising:
one or more processors coupled with memory, wherein the one or more processors are configured to:
receive at the base station a signal from the wireless device that is indicative of and responsive to a specific subframe type that was previously transmitted from the base station to the wireless device, wherein the specific subframe type is selected from one or more special subframes, wherein the special subframes serve as switching points between DL to UL transmission;
perform subframe-type-specific block error rate (BLER) filtering based at least on the specific subframe type;
perform subframe-type-specific outer-loop link adaptation (LA) based at least on the subframe-type-specific BLER filtering; and
transmit from the base station to the wireless device subframe-type-specific scheduling and modulation and coding scheme (MCS) information based at least on the subframe-type-specific outer-loop LA.

9. The apparatus of claim 8, wherein the signal includes ACK / NACK data for the specific subframe type.

10. The apparatus of claim 8, wherein the signal includes channel state information for the specific subframe type.

11. The apparatus of claim 8, wherein performing subframe-type-specific outer-loop LA includes:
adjusting a subframe-type-specific step size of a subframe-type-specific MCS differently for different types of subframes, wherein:
for a first type of subframe, when the subframe-type-specific BLER filtering is above a subframe-type-specific BLER target, the subframe-type-specific step size is bigger than when the same condition is met for a second type of subframe, and
for the first type of subframe, when the subframe-type-specific BLER filtering is below the subframe-type-specific BLER target, the subframe-type-specific step size is smaller than when the same condition is met for the second type of subframe.

12. The apparatus of claim 8, wherein performing subframe-type-specific outer-loop LA includes:
receiving at the base station a channel quality signal from the wireless device;
calculating a Doppler frequency based at least on the channel quality signal; and
performing the subframe-type-specific BLER filtering and the subframe-type-specific outer-loop LA to include a Doppler-dependency, wherein:
if the filtered BLER is greater than a BLER target, then the higher the Doppler frequency the bigger a step size for adjusting the MCS lower, and
if the filtered BLER is not greater than a BLER target, then the higher the Doppler frequency the smaller the step size for adjusting the MCS higher.

13. A computer-program storage apparatus for performing link adaptation in a wireless communication system that includes a base station and at least one wireless device comprising a memory having one or more software modules stored thereon, the one or more software modules being executable by one or more processors and the one or more software modules including:
code for receiving at the base station a signal from the wireless device that is indicative of and responsive to a specific subframe type that was previously transmitted from the base station to the wireless device, wherein the specific subframe type is selected from one or more special subframes, wherein the special subframes serve as switching points between DL to UL transmission;
code for performing subframe-type-specific block error rate (BLER) filtering based at least on the specific subframe type;
code for performing subframe-type-specific outer-loop link adaptation (LA) based at least on the subframe-type-specific BLER filtering; and
code for transmitting from the base station to the wireless device subframe-type-specific scheduling and modulation and coding scheme (MCS) information based at least on the subframe-type-specific outer-loop LA.

14. The apparatus of claim 13, wherein the signal includes ACK / NACK data for the specific subframe type.

15. The apparatus of claim 13, wherein the signal includes channel state information for the specific subframe type.

16. The apparatus of claim 13, wherein performing subframe-type-specific outer-loop LA includes:
code for adjusting a subframe-type-specific step size of a subframe-type-specific MCS differently for different types of subframes, wherein:
for a first type of subframe, when the subframe-type-specific BLER filtering is above a subframe-type-specific BLER target, the subframe-type-specific step size is bigger than when the same condition is met for a second type of subframe, and for the first type of subframe, when the subframe-type-specific BLER filtering is below the subframe-type-specific BLER target, the subframe-type-specific step size is smaller than when the same condition is met for the second type of subframe.

17. The apparatus of claim 13, wherein performing subframe-type-specific outer-loop LA includes:
code for receiving at the base station a channel quality signal from the wireless device;
code for calculating a Doppler frequency based at least on the channel quality signal; and
code for performing the subframe-type-specific BLER filtering and the subframe-type-specific outer-loop LA to include a Doppler-dependency, wherein:
if the filtered BLER is greater than a BLER target, then the higher the Doppler frequency the bigger a step size for adjusting the MCS lower, and
if the filtered BLER is not greater than a BLER target, then the higher the Doppler frequency the smaller the step size for adjusting the MCS higher.

18. The method of claim 1, wherein the one or more special subframes are distinguished by having different numbers of reference signal (RS) symbols.

19. The apparatus of claim 8, wherein the one or more special subframes are distinguished by having different numbers of reference signal (RS) symbols.

20. The apparatus of claim 13, wherein the one or more special subframes are distinguished by having different numbers of reference signal (RS) symbols.

* * * * *